(12) United States Patent
Donnelly et al.

(10) Patent No.: US 6,348,268 B1
(45) Date of Patent: Feb. 19, 2002

(54) LAMINATED ARCHITECTURAL PRODUCT WITH MOISTURE BARRIER CHARACTERISTIC

(75) Inventors: Robert L. Donnelly, 1881 SW. Front Ave., Portland, OR (US) 97201; Carl R. Gerdts, Redmond, OR (US)

(73) Assignee: Robert L. Donnelly, Portland, OR (US)

( * ) Notice: Subject to any disclaimer, the term of this patent is extended or adjusted under 35 U.S.C. 154(b) by 940 days.

(21) Appl. No.: 08/513,350

(22) Filed: Aug. 10, 1995

(51) Int. Cl.[7] .......................... B32B 21/08; B32B 27/40
(52) U.S. Cl. ................... 428/425.1; 428/507; 428/511; 428/512; 428/513; 428/537.1
(58) Field of Search ............... 428/425.1, 507, 428/511, 512, 513, 537.1

(56) References Cited

U.S. PATENT DOCUMENTS

| | | | |
|---|---|---|---|
| 3,538,055 A | * 11/1970 | Camilleri et al. | 428/424.6 |
| 5,116,446 A | 5/1992 | Cannon | 156/307.4 |
| 5,415,943 A | * 5/1995 | Groger et al. | 428/537.1 |
| 5,439,749 A | * 8/1995 | Klasell et al. | 428/537.1 |

* cited by examiner

*Primary Examiner*—D. S. Nakarani
(74) *Attorney, Agent, or Firm*—Chernoff, Vilhauer, McClung & Stenzel

(57) ABSTRACT

A laminated structure for forming architectural products includes an unstable wood core that has a laminate on its inner or room facing side that provides a selected interior design such as wood veneer. This laminate is secured to the core by an adhesive that limits a moisture penetration of approximately 5 gms/sq.mtr/hr. or less. Either polyurethane hotmelt or polyolefin hotmelt are useful as the adhesive. Such interior moisture barrier is combined with an outer surface that also comprises a moisture barrier such as by the above adhesives, or by a liquid coating, cladding, or a resin saturated paper overlay.

4 Claims, 1 Drawing Sheet

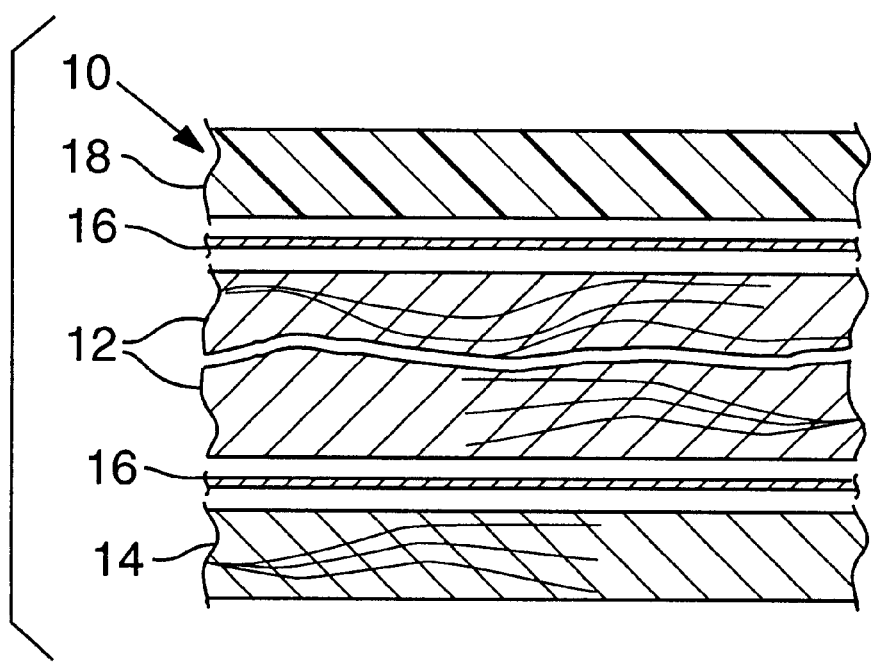

LAMINATED ARCHITECTURAL PRODUCT WITH MOISTURE BARRIER CHARACTERISTIC

BACKGROUND OF THE INVENTION

This invention relates to new and useful components assembled into laminated architectural products such as patio doors or other products typically used as barriers between the interior and exterior of a house or other building.

Doors and other architectural products that are exposed to the exterior of houses or other buildings are often constructed of unstable wood and therefore are subject to warping. The exterior surface of these products is often protected from the weather either by multiple liquid coatings, liquid coatings over a weather and/or moisture resistant overlay, or by a special cladding (typically aluminum or PVC). As an example, U.S. Pat. No. 5,116,446 illustrates a method of treating the exterior surface of an unstable wood core or substrate by applying a resin saturated overlay in a laminate that not only provides a smooth structure that virtually eliminates surface contamination, uneven surfaces, and telegraphing of surface imperfections, but also serves as a moisture barrier from the exterior. In many cases, this exterior surface protection increases the potential for warping because the interior surface, which serves more of an aesthetic function, often does not have equal protection against moisture penetration. The result is warpage of the product whenever there is a prolonged differential in humidity between the interior and exterior of a building. Warpage detracts from the appearance of the products and interferes with proper fitting and locking.

One solution for this problem is to seal the interior surface with the addition of a subsurface layer of a resin saturated overlay in a laminate that provides a moisture barrier. Quite often, however, this is not practical for desired aesthetics in the room, and it also may not be economically practical. Furthermore an overlay on the inner surface furthers the chance for error and one more possibility of delamination in the field.

SUMMARY OF THE INVENTION

The primary objective of this invention is to construct an architectural product using a unique family of adhesives that not only provides a bond between a wood core and a wide variety of interior or exterior overlays in a laminated construction, but also provides an effective barrier to moisture migration from surface to surface between the laminates and the wood core. The result is an engineered product manufactured primarily or wholly from wood that remains dimensionally stable in a wide variety of climates.

A more specific object is to provide a laminated architectural product having an inner or room facing laminate that is bonded to an unstable core by an adhesive that limits a moisture penetration therethrough of approximately 5 gms/sq. mtr/hr. or less, the adhesive being selected from the group consisting of polyurethane and polyolefin in hotmelt adhesives to form the strong adherence and effective moisture barrier. This laminate is used on the core in combination with a weather facing laminate or covering that likewise maintains at least such minimum moisture penetration.

In carrying out the objects of the invention the product of the invention comprises a body portion of the type that is constructed of a dimensionally unstable wood core. To prevent warping when the core is subjected to varied moisture conditions on its opposite sides, the core is protected with laminated structure moisture barriers on each of its interior and exterior sides. The moisture barrier on its inner side comprises the above mentioned adhesives that secure a laminate to the core and the moisture barrier on its outer side can comprise the herein mentioned adhesive or any other satisfactory type of moisture barrier that meets the requirement of limiting a moisture penetration of approximately 5 gms/sq.mtr/hr. or less.

The moisture barrier adhesive used with the invention, namely, the adhesives selected from the group consisting of polyurethane hotmelt adhesive and polyolefin hotmelt adhesive has not only been found to provide the desired moisture barrier for the inner and/or outer side laminates but also provide the desired adherence properties.

The invention will be better understood and additional objects and advantages will become apparent from the following description taken in connection with the accompanying drawings.

BRIEF DESCRIPTION OF THE DRAWING

The drawing comprises an exploded fragmentary sectional view of an architectural product embodying the present invention.

DETAILED DESCRIPTION OF PREFERRED EMBODIMENTS

With reference to the drawing, the reference numeral 10 designates a product of the invention, such as for example a stile portion of a residential patio door. This type of product is commonly constructed of an unstable core 12 such as wood. A door or other product of this type will warp when the unstable core is subjected to a differential in moisture on opposite sides thereof.

According to the invention, the interiorly directed or room side portion of the core 12 has a laminate 14 thereon that comprises an appropriate interior wall covering, such as for example a wood veneer. According to the invention, this laminate is secured to the core by an adhesive layer 16 of a type selected from a group consisting of adhesives forming a moisture barrier that limits moisture penetration therethrough of approximately 5 gms/sq.mtr/hr. or less, wherein the unstable core will not lose or gain moisture from its interior or room side. Two particular classes of adhesives that effectively adhere the veneer to the core and form a moisture barrier with the above results are polyurethane hotmelt and polyolefin hotmelt. These two adhesives have been found to serve as an effective and satisfactory moisture barrier. An adhesive generally referred to as a waterproof adhesive will not necessarily, nor typically, function for the intended purpose. That is, the polyurethane and polyolefin hotmelt adhesives obtain cohesive strength through crosslinking as do waterproof adhesives but in addition the former provide a solid film in their bonding function through which vapor cannot penetrate any more than a negligible amount. The two poly adhesives mentioned meet applicant's condition of limiting moisture penetration of approximately 5 gms/sq. mtr/hr. or less. In addition, such adhesives upon being heated to a liquid state can readily be applied in a conventional manner and in a cold press. This type of assembly, namely, cold pressing, with either of the two poly adhesives listed provides good adherence to the core and at the same time maintains a smooth, even surface without causing telegraphed imperfections.

As stated, the outwardly facing side of the product also must include a moisture barrier in order to provide the substantial equal moisture protection from both sides of the product. Preferably, the outer side also uses an adhesive layer 16 of the adhesives disclosed herein as the bonding adhesive for an outer laminate 18, but it is to be understood that the outer side of the core can use other types of moisture barriers such as a resin saturated laminate or, too, multiple liquid coatings or special cladding may be applied.

When the laminates 14 and 18 are adhered to the core 12 with the moisture barrier adhesive 16, the resulting combination of compounds develops a stable construction that will not warp when subjected to varying moisture conditions. This characteristic of the adhesives used herein thus allows construction of an assembly of minimum cost and wherein the interior as well as the exterior if desired is provided with a veneer faced layer by cold pressing a single glue line, as opposed to a costly application of a moisture barrier, for example, in the form of a phenolic resin saturated layer or an aluminum layer. Also, the use of the disclosed adhesives allows the use of wood veneers, thus providing for a low cost overall structure and also providing for a pleasing surface such as a wood grain surface.

It is to be understood that the form of our invention herein shown and described are to be taken as preferred examples of the same and that various changes in the shape, size and arrangement of parts may be resorted to without departing from the spirit of our invention or the scope of the subjoined claims.

Having thus described our invention, we claim:

What is claimed is:

1. In an architectural product installed in a building and having a core portion with an interior face surface and an exterior face surface directed respectively toward an interior and an exterior of said building and being inherently unstable in dimension if subjected to varying moisture conditions at said interior and exterior face surfaces, and having a moisture barrier on said exterior face surface exposed to the exterior of said building, the improvement which comprises polyurethane laminating adhesive overlying said interior face surface preventing a moisture penetration into said interior face surface of more than about five grams per square meter of said interior face surface per hour, thereby substantially shielding said core portion from moisture relative to said interior face surface, and at least one lamina layer overlying said interior face surface and adhered to said interior face surface by said laminating adhesive, said lamina layer including an aesthetic architectural interior design surface visibly exposed to the interior of said building.

2. The product of claim 1 wherein said lamina layer is a wood veneer having said interior design surface.

3. The product of claim 1 wherein said moisture barrier on said exterior face surface comprises further laminating adhesive overlying said exterior face surface preventing a moisture penetration into said exterior face surface of more than about five grams per square meter of said exterior face surface per hour.

4. The product of claim 3 wherein said moisture barrier on said exterior face surface includes at least one lamina layer overlying said exterior face surface and adhered to said exterior face surface by said further laminating adhesive.

* * * * *